United States Patent [19]

Krude

[11] Patent Number: 5,184,494
[45] Date of Patent: Feb. 9, 1993

[54] METHOD OF FORMING UNIVERSAL JOINT HOUSINGS

[75] Inventor: Werner Krude, Neunkirchen, Fed. Rep. of Germany

[73] Assignee: GKN Automotive, Inc., Auburn Hills, Mich.

[21] Appl. No.: 735,449

[22] Filed: Jul. 25, 1991

[51] Int. Cl.⁵ .............................................. B21K 1/26
[52] U.S. Cl. .................................... 72/254; 72/355.6; 29/415
[58] Field of Search ................. 72/254, 256, 259, 261, 72/267, 355.6; 29/415

[56] References Cited

U.S. PATENT DOCUMENTS

| | | |
|---|---|---|
| 717,886 | 1/1903 | Mercader et al. ................. 72/355.6 |
| 2,755,543 | 7/1956 | Dunn et al. ............................ 72/256 |
| 3,330,782 | 8/1967 | Peras ...................................... 72/256 |
| 4,116,020 | 9/1978 | Aucktor et al. . |
| 4,188,803 | 2/1980 | Otsuka et al. . |
| 4,610,643 | 9/1986 | Krude . |
| 4,694,676 | 9/1987 | O'Brien . |

*Primary Examiner*—Lowell A. Larson
*Attorney, Agent, or Firm*—Harness, Dickey & Pierce

[57] ABSTRACT

A method of manufacturing a universal joint outer housing which produces an extrusion which consists of two outer housing instead of one. The outer housing are formed adjacent to each other and are separated during the machining of the finished housings. This provides a significant cost saving by providing two extrusions during a process which originally produced only a single extrusion.

6 Claims, 5 Drawing Sheets

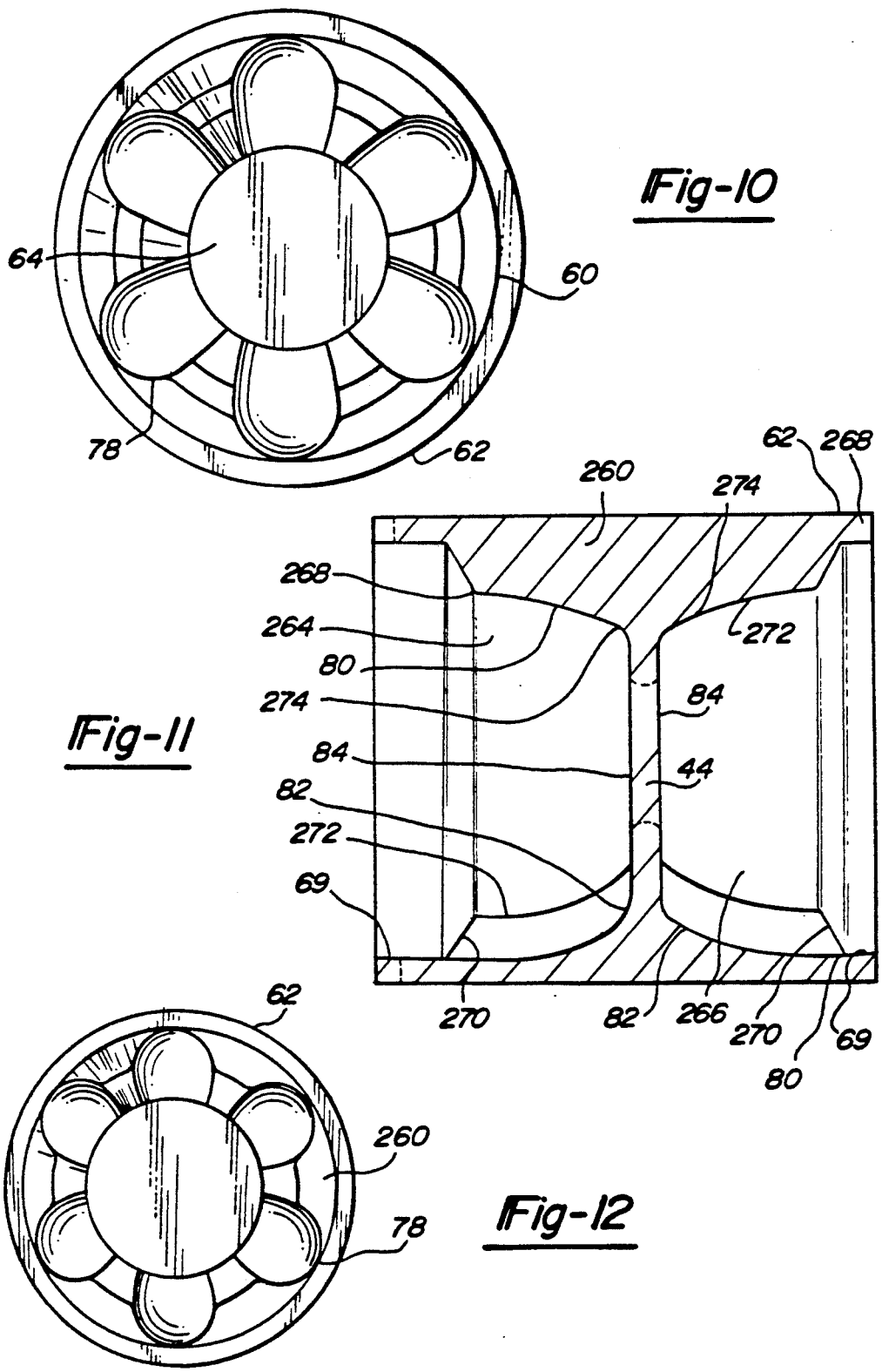

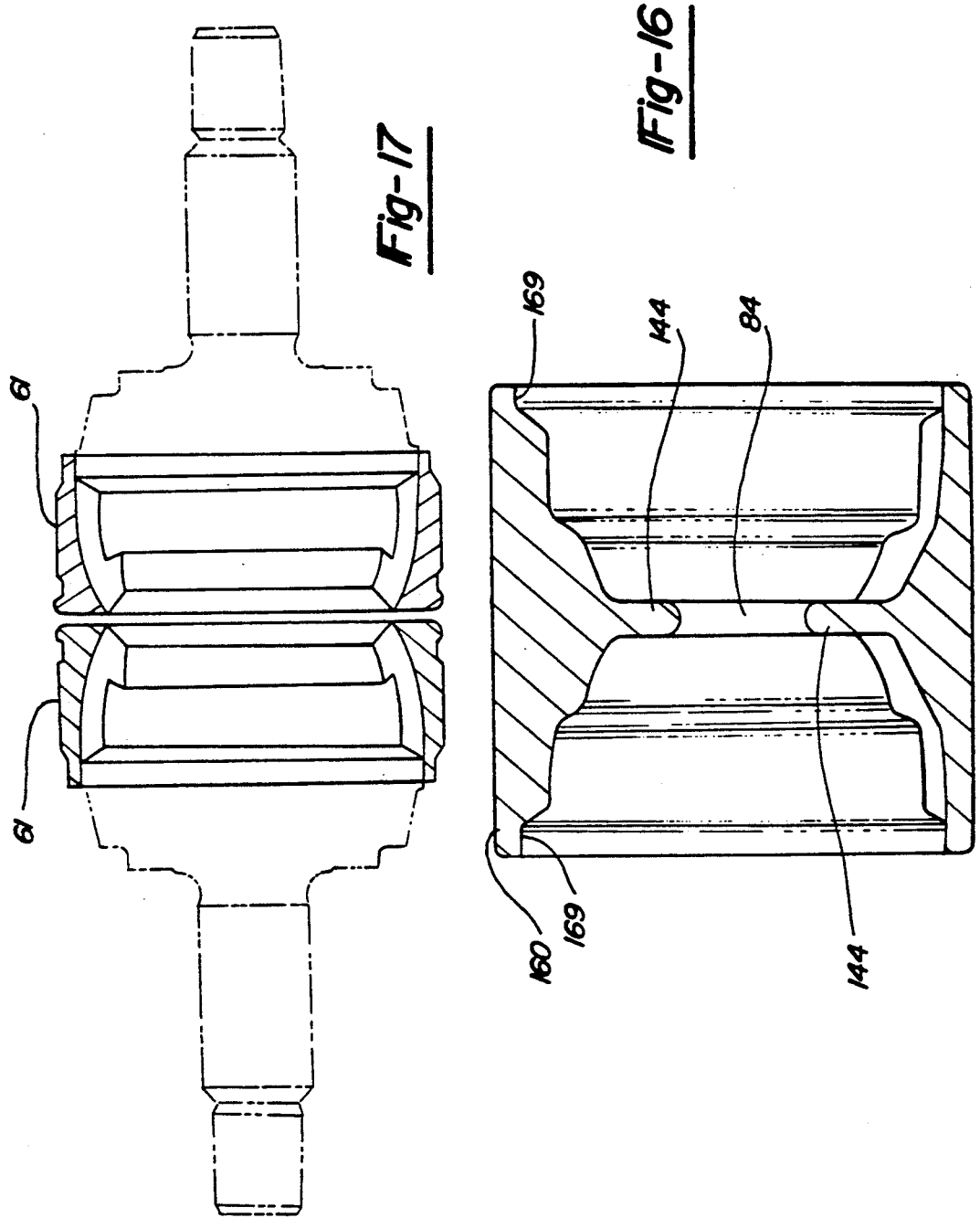

METHOD OF FORMING UNIVERSAL JOINT HOUSINGS

BACKGROUND OF THE INVENTION

This invention relates generally to an apparatus and method of manufacturing a constant velocity universal joint housing and, more particularly, to forming a pair of adjacent housings.

Constant velocity universal joint outer race housings typically have been extruded with an integral stub shaft. This is true for almost all fixed and plunge type of constant velocity universal joints with the exceptions being various joints designed for a flange type of connection. U.S. Pat. No. 4,188,803, issued to Otsuka et al. on Feb. 19, 1980, shows a typical single piece outer housing design for a fixed universal joint design. U.S. Pat. No. 4,694,676, issued to O'Brien on Sep. 22, 1987, shows a method of manufacturing a tri-pod universal joint housing having a closure and an attachment shank at one end.

Recent designs of constant velocity universal joints, in particular the fixed joint type, have been developed using a two piece outer joint housing. One piece of the housing is the outer race, the other piece the stub shaft. U.S. Pat. No. 4,116,020, issued to Aucktor et al. on Sep. 26, 1978, and U.S. Pat. No. 4,610,643, issued to Krude on Feb. 19, 1985, are typical examples of the fixed joint type of constant velocity joints designed with a two piece outer housing. Both patents require the open end of the outer housing to face towards the stub shaft thus precluding the manufacture of the complete housing as a one piece unit.

One disadvantage of the two piece outer housing is the added cost to manufacture two extrusions or forgings in order to produce one outer joint housing. The amount of steel in a one piece and a two piece design is nearly identical. The added cost comes from the need to have two extrusions or forgings instead of one.

Accordingly, it is desirous to have an extrusion which produces more than one outer joint housing.

SUMMARY OF THE INVENTION

The present invention provides the art with a method of forming two parts for a constant velocity joint from a single extrusion process. In the process, two outer joint housings are formed adjacent to each other during a single extrusion process.

From the following detailed description of the present invention, taken in conjunction with the accompanying drawings and claims, other objects and advantages of the present invention will become apparent to those skilled in the art.

DESCRIPTION OF THE DRAWINGS

FIG. 10 is an end elevation view of the finished extrusion shown in FIG. 9.

FIG. 11 is a cross-section view like that of FIG. 9 of a finished extrusion according to another embodiment of the present invention.

FIG. 12 is an end elevation view of the extrusion shown in FIG. 11.

FIG. 16 is a cross-section view like that of FIG. 9 of a finished extrusion according to another embodiment of the present invention.

FIG. 17 is a cross-section view of the finish machined housings in accordance with the present invention.

DETAIL DESCRIPTION OF THE INVENTION

The detailed description will describe the manufacturing of an outer housing extrusion as it pertains to fixed center ball joints. It is assumed that a person skilled in the art, can take the manufacturing methods herein described and apply them to the other types of constant velocity universal joint outer housings.

Figure 1:
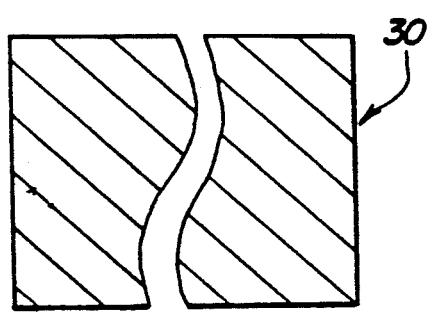
FIG. 1 is a side elevation view of a cylindrical slug used in manufacturing a constant velocity joint housing portion in accordance with the present invention.
Figure 2:
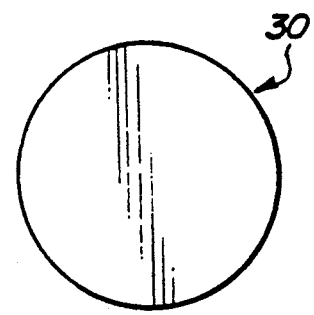
FIG. 2 is an end elevation view of the slug shown in FIG. 1.

Referring now to the drawings and particularly to FIGS. 1 and 2, the method of forming an outer housing starts by cropping off a cylindrical slug 30 of a predetermine weight, diameter and length from a piece of desired bar stock. Several slugs may be cropped from the same piece of bar stock by methods well known in the art. The cylindrical stub 30 is the starting point for all of the embodiments of the present invention.

Figure 3:
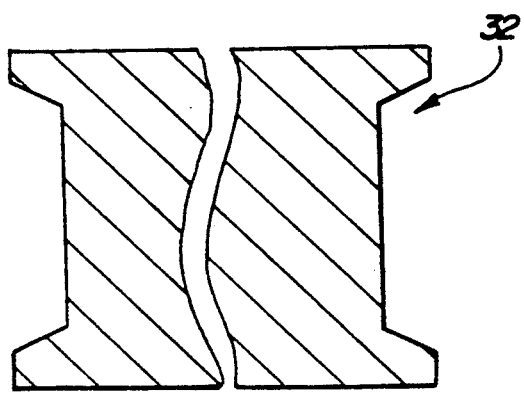
FIG. 3 is a side elevation view of a partially formed part made from the slug shown in FIGS. 1 and 2, in accordance with the present invention.
Figure 4:
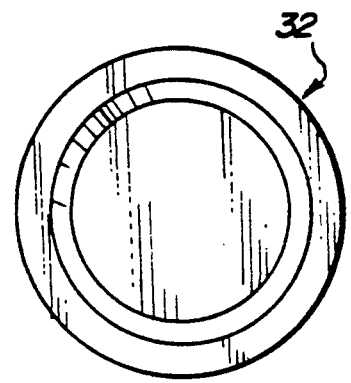
FIG. 4 is an end elevation view of the part shown in FIG. 3.

According to a first embodiment of the present invention, the cylindrical stub 30 is heated using methods known in the art to a temperature of approximately 1700° F. The heated cylindrical slug 30 is then transferred to a set of dies in a transfer press where the first in a series of hits are conducted on the slug 30 to form a part 32 as shown in FIGS. 3 and 4.

Figure 5:
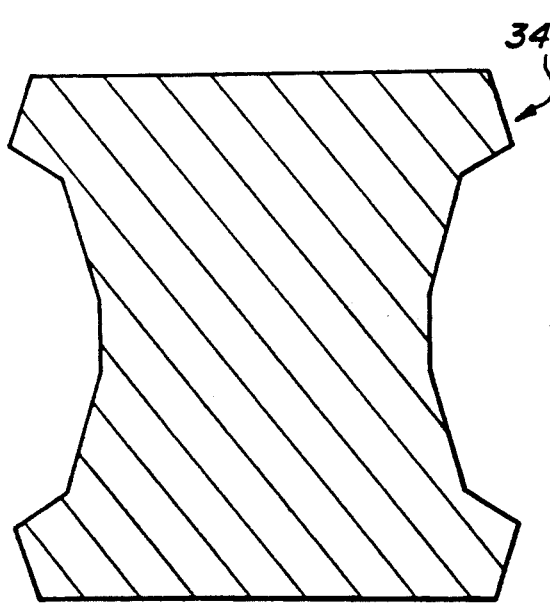
FIG. 5 is another side elevation view of a partially formed part made from the formed part of FIGS. 3 and 4.
Figure 6:
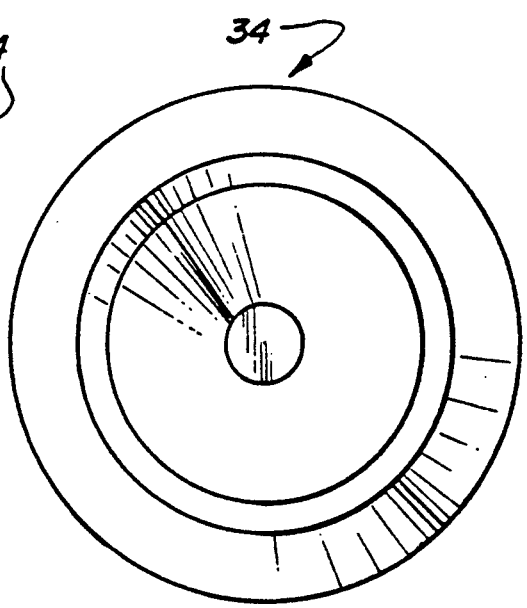
FIG. 6 is an end elevation view of the part shown in FIG. 5.

Formed part 32 is transferred to a second set of dies in the transfer press and additionally hit to produce the preformed part 34 shown in FIGS. 5 and 6.

Preformed part 34 is transferred to a third set of dies in the transfer press. The third set of dies produces a backward extruded part 36 shown in FIGS. 7 and 8.

Figure 7:
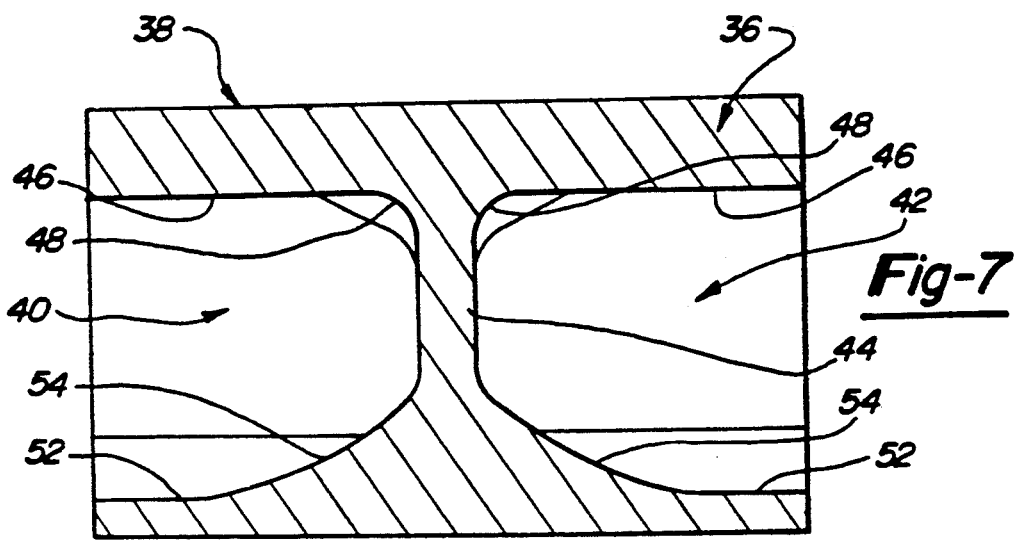
FIG. 7 is a cross-section view of a backward extruded part formed from the part in FIGS. 5 and 6.
Figure 8:
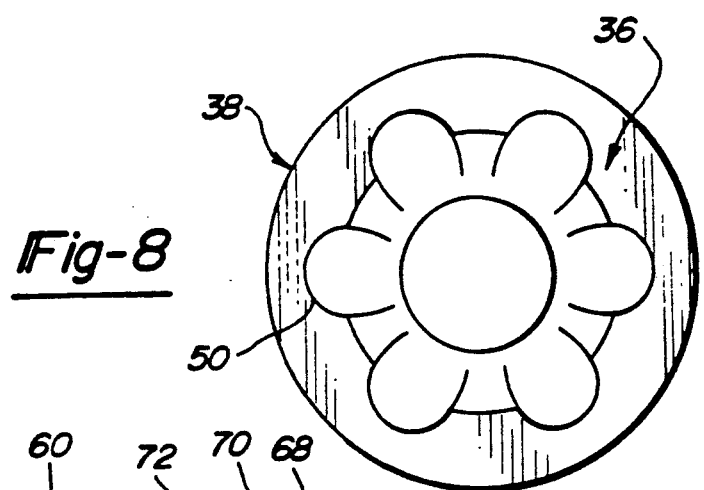
FIG. 8 is an end elevation view of the part shown in FIG. 7.

Referring to FIGS. 7 and 8, during the extrusion of backward extruded part 36 in the third set of dies, the part 36 is formed to include a cylindrical wall 38 with a pair of internal cavities 40 and 42 separated by a web 44. The internal cavities 40 and 42 are defined by an inner wall surface 46 which blends into the web 44 at blend radius 48. The inner wall surface 46 includes a plurality of circumferentially spaced and radially extending ball grooves 50. The ball grooves 50 have a straight portion 52 and a blend radius 54 which blend into the web 44 as seen in FIG. 7.

The backward extruded part 36 is then cooled. After cooling, the backward extruded part 36 is annealed in a conventional manner and coated with a suitable lubricant. The backward extruded part is transferred to a set of dies in a cold forming press. The part is draw wiped in the cold forming press to produce the extrusion 60 shown in FIGS. 9 and 10.

The extrusion 60 has a cylindrical wall 62 with a pair of internal cavities 64 and 66 separated by web 44. Each of the internal cavities 64 and 66 are defined by an inner wall surface 68.

Figure 9:
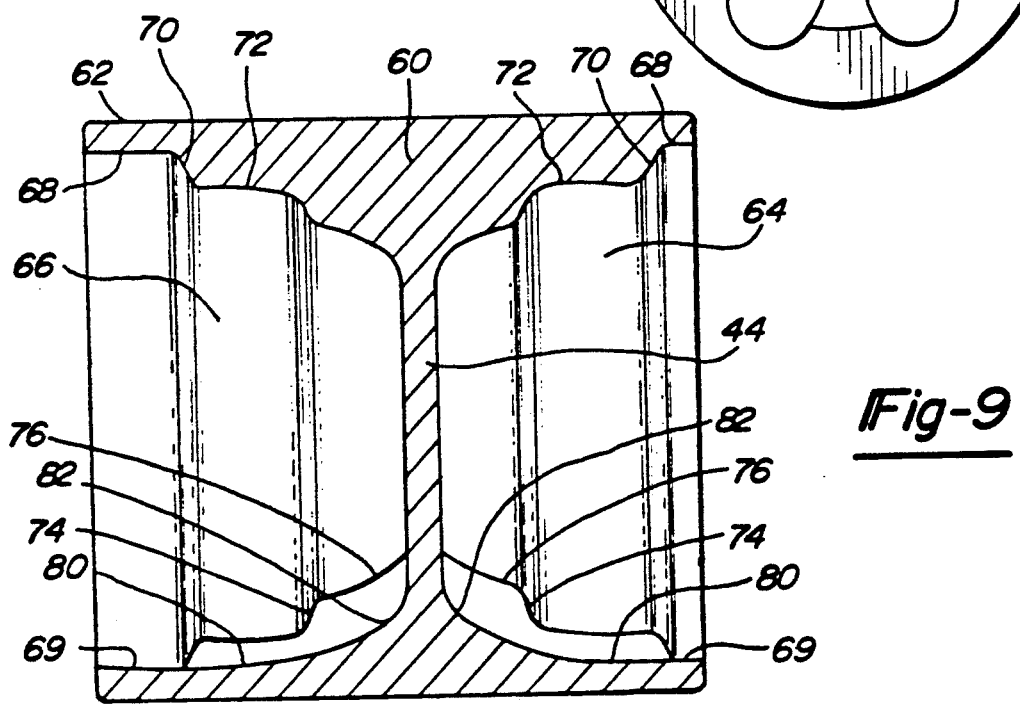
FIG. 9 is a cross-section view of the finished extrusion of the backward extruded part shown in FIGS. 7 and 8.
Figure 15:
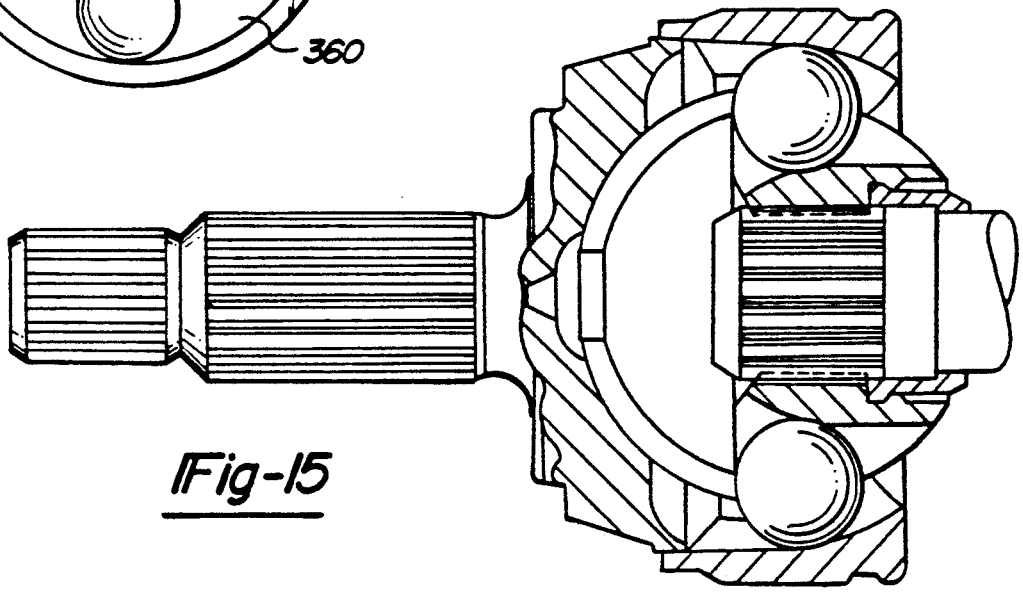
FIG. 15 is a side elevation view partially in cross-section of a complete constant velocity joint assembly using the extrusions of the present invention.

Each inner wall surface 68 includes a first cylindrical portion 69, a first chamfered portion 70, a second cylindrical portion 72, a second chamfered portion 74, and a cup shaped portion 76 which terminates with web 44 as seen in FIG. 9. This first cylindrical portion 69 may be machined to mate with a stub shaft during manufacture of the constant velocity joint as illustrated in FIG. 15. As can be seen in FIG. 9, one of the first cylindrical portions 69 is longer than the other. The length of the shorter first cylindrical portion 69 is determined by the size of the portion needed to manufacture the mating configuration. The length of the longer first cylindrical portion 69 is determined by the mass of the slug used. The free flow of the material during the above manufacturing process is allowed to accumulate at one end of the extrusion. Thus, this end must be machined to the desired specifications.

Shown in FIG. 16 is an extrusion 160 which is a different version of the extrusion 60. In this version, the extrusion is the same except the excess material is allowed to accumulate in the web section 144 instead of at one of the first cylindrical portions 69. This version has first cylindrical portions 169 which are equal in length and their dimensions are defined by the amount of material required to manufacture the mating configuration. The web 144 is of an open design with a hole 84 whose diameter is defined by the amount of material in the slug.

The first and second chamfered areas 70 and 74 provide transition areas between the first cylindrical portion 69 and the second cylindrical portion 72, and the second cylindrical portion 72 and the cup shaped portion 76, respectively, during the forming process. The cup shaped portion 76 defines the bottom of both cavities mating with the web section 44.

A plurality of circumferentially spaced and radially extending ball grooves 78 are formed into the first chamfered area 70, the second cylindrical portion 72, the second chamfered area 74 and the cup shaped portion 76. The ball grooves 78 include a straight section 80 which transitions into a curved section 82 which eventually blends with the web 44.

The extrusion 60 shown in FIGS. 9 and 10 is machined by conventional machining techniques into two outer joint housings 61 as shown in FIG. 17. The housings are also shown with the separate stub shafts in phantom.

The second embodiment of the present invention is shown in FIGS. 11 and 12. In the discussion of FIGS. 11 and 12, the elements which are the same as those shown in FIGS. 9 and 10 have the same reference numerals.

The steps for forming the extrusion 260 of the second embodiment shown in FIGS. 11 and 12 are the same up through the steps discussed above through FIGS. 7 and 8. The extrusion 260 is likewise formed by draw wiping the backward extruded part shown in FIGS. 7 and 8. The extrusion 260 has a cylindrical wall 62 with a pair of internal cavities 264 and 266. Each internal cavity 264 and 266 is defined by an inner surface 268.

Each inner wall surface 268 includes a first cylindrical portion 69, a chamfered area 270, a second cylindrical portion 272 and a blend radius area portion 274 which terminates with the web 44 as seen in FIG. 11.

The first cylindrical portion 69, in FIG. 11, is the same as that in FIG. 9 where one is longer that the other. Accordingly, the same flow as explained above which occurs with respect to the embodiment of FIG. 9 occurs with respect to the embodiment of FIG. 11. Likewise, the embodiment shown in phantom in FIG. 11 is similar to the embodiment shown in FIG. 16 which has the first cylindrical portions of equal size, includes web 144 with a hole 84, whose diameter is defined by the amount of material in the slug.

The first chamfer area 270 provides a transition area between the first cylindrical portion 69 and the second cylindrical portion 272 during the forming process. The radius portion 274 defines the bottom of both cavities with the web section 44.

A plurality of circumferentially spaced and radially extending ball grooves 78 are formed into the chamfered portion 270, the second cylindrical portion 272 and the radius portion 274. The ball grooves 78 include a straight section 80 which transitions into a curved portion 82 which eventually blends with the web 44.

Likewise, as mentioned above, the extrusion part 260 shown in FIGS. 11 and 12 is machined by conventional techniques into two outer race housings similar to those shown in FIG. 17.

Figure 13:
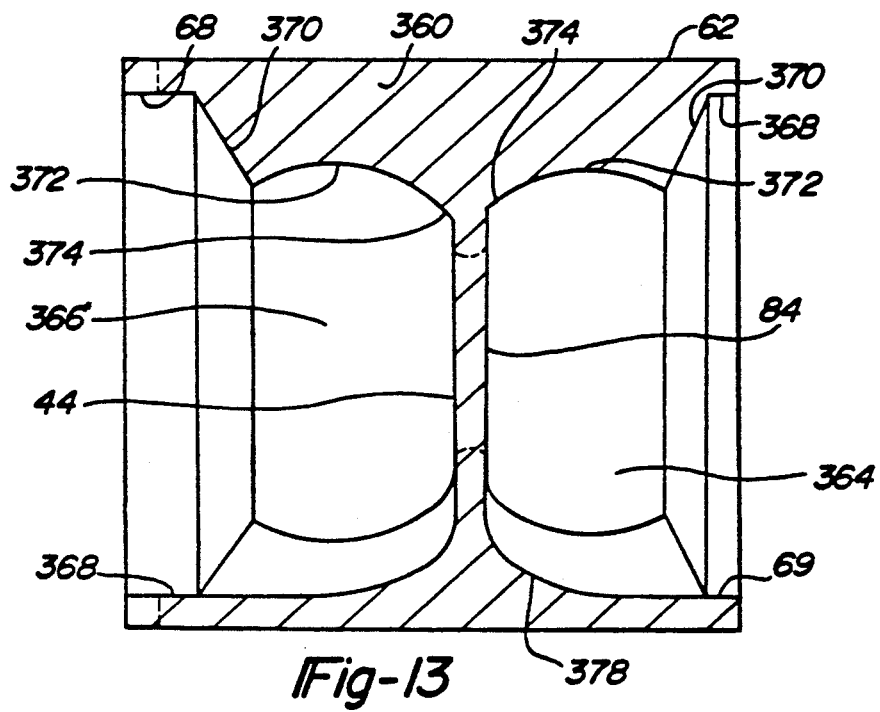
FIG. 13 is a cross-section view like that of FIG. 9 of a finished extrusion according to another embodiment of the present invention.
Figure 14:
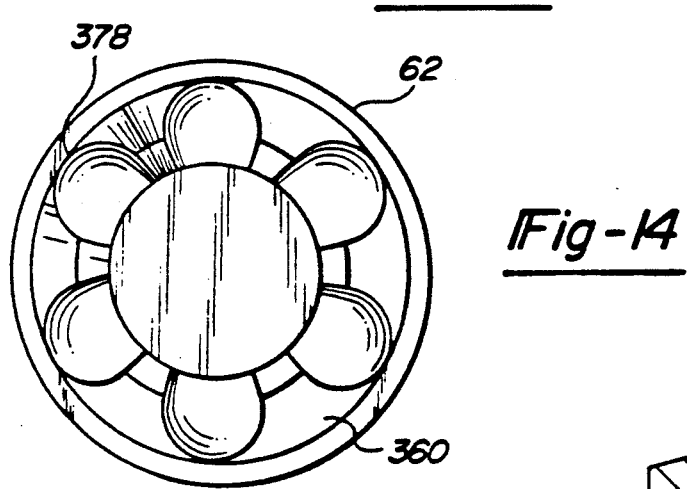
FIG. 14 is an end elevation view of the finished extrusion as shown in FIG. 13.

The next embodiment of the present invention is illustrated in FIGS. 13 and 14. In the discussion of FIGS. 13 and 14, the elements which are the same as those shown in FIGS. 9 and 10 are identified with the same reference numerals.

The extrusion 360 has a cylindrical outer wall 62 with a pair of internal cavities 364 and 366 separated by a web 44. Each of the internal cavities 364 and 366 is defined by an inner wall surface 368. Each inner wall surface 368 includes a first cylindrical portion 69, a chamfered area 370, a spherical portion 372 and a radius portion 374 which terminates with the web 44 as seen in FIG. 13.

As mentioned above, the first cylindrical portion 69 is machined to mate with a hub shaft during manufacture of constant velocity joints. Likewise, the extrusion 360 may be formed with one of the first cylindrical portions 69 longer than the other or with a web 144 including a hole 84 whose diameter is defined by the amount of material in the slug as illustrated in phantom.

The chamfered portion 370 provides a transition area between the first cylindrical portion 69 and the spherical portion 372 during the forming process. The spherical section continues into the radius portion 374 which, in turn, blends the spherical portion 372 into the web 44.

The plurality of circumferentially spaced and radially extending ball grooves 378 are formed into the chamfer portion 370, spherical portion 372 and radius portion 374. The ball grooves 378 are continuously curved along the path which starts at the first cylindrical portion 69 and is continuous through the cavity and eventually blends with the web 44.

Likewise, as mentioned above, the part 370 is machined by conventional techniques into two outer joint housings as mentioned above.

While the above detailed description describes the preferred embodiment of the present invention, it should be understood that the present invention is susceptible to modification, variation and alteration without deviating from the scope and fair meaning of the subjoined claims.

What is claimed is:

1. A method of manufacturing an extrusion comprising the steps of:
   providing a slug having a predetermined mass;
   forming a housing having a cylindrical outer wall with first and second open ends;
   forming an inner wall surface in said housing defining a first cavity at said first open end and a second cavity at said second open end wherein said cavities are simultaneously formed by backward extrusion;
   forming a web in said housing between said first and second open ends said web defining the other end of each of said cavities; and
   forming a plurality of circumferentially spaced ball grooves during said backward extrusion in each of said cavities radially extending into said inner wall surface such that said outer wall has a non-uniform radial thickness, said ball grooves longitudinally extending from said open end to said other end of each of said cavities and severing said part at said web to form two parts.

2. The method of manufacturing an extrusion as defined in claim 1 further comprising forming an extrusion preform.

3. The method of manufacturing an extrusion as defined in claim 2 further comprising backward extruding said extrusion preform to produce a backward extruded extrusion.

4. The method of manufacturing an extrusion as defined in claim 3 further comprising draw-wiping said backward extruded extrusion.

5. The method of manufacturing an extrusion as defined in claim 4 further comprising the step of annealing prior to said draw-wiping.

6. The method of manufacturing an extrusion as defined in claim 1 further comprising heating said slug prior to forming.

* * * * *